B. L. RYDER.

FRUIT-DRIER.

No. 7,654.

Reissued May 1, 1877.

Witnesses
Ed. L. Dietrich
J. Vance Lewis

Inventor.
Ben. L. Ryder.
by Daniel Breed
Atty.

N. PETERS, PHOTO-LITHOGRAPHER, WASHINGTON, D. C.

UNITED STATES PATENT OFFICE.

BENJAMIN L. RYDER, OF CHAMBERSBURG, PENNSYLVANIA.

IMPROVEMENT IN FRUIT-DRIERS.

Specification forming part of Letters Patent No. 133,060, dated November 12, 1872; reissue No. 7,654, dated May 1, 1877; application filed June 23, 1876.

*To all whom it may concern:*

Be it known that I, BENJAMIN L. RYDER, of Chambersburg, in the county of Franklin and State of Pennsylvania, have invented certain new and useful Improvements in Fruit-Driers; and I do hereby declare that the following is a full, clear, and exact description thereof, that will enable others skilled in the art to which it appertains to make and use the same, reference being had to the accompanying drawings, and to the letters of reference marked thereon, which form a part of this specification, and in which drawings—

Figure 1:
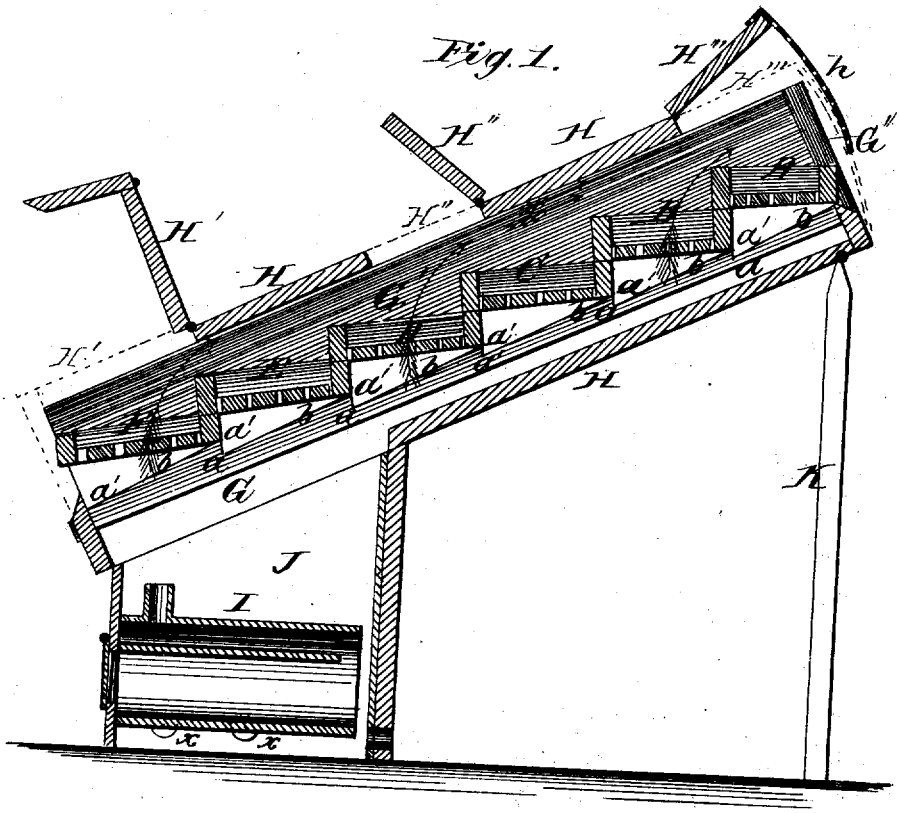
Figure 2:
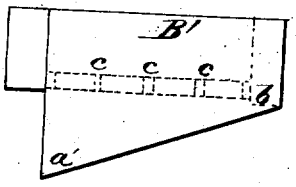
Figure 3:
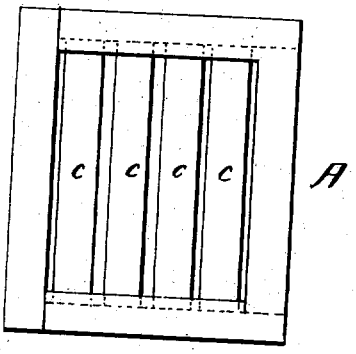

Figure 1 is a vertical and longitudinal section of my fruit-drier. Figs. 2 and 3 are views of the trays or screens detached.

The chief object of my invention is to divide the general current of heated air, and direct the smaller currents into separate flues or air-passages, and to the under side of drying screens or trays with perforated bottoms, thus allowing the dry air to pass up through the screens or trays with perforated bottoms, and come in contact with the fruit for only a moment, and then pass on to escape from the drying-chamber without more contact with the fruit or material to be dried.

My invention consists, first, of a drying-chamber having a series of separate flues or air-passages, provided with drying screens or trays with perforated bottoms; and, secondly, in an inclined series of separate flues and perforated trays, arranged between a lower and an upper air-passage, and in other improvements, all of which will be fully understood by the following description.

In carrying out the first part of my invention the drying-chamber may be of any suitable form, and yet I prefer, as most economical, a narrow inclined box, as shown at H, Fig. 1. The sides of this box have strips or tracks *a*, Fig. 2, fastened to the inner sides, for the purpose of supporting the drying-screens or fruit-trays, the bottoms of which are perforated for the passage of hot air, as will be hereafter explained.

The construction of the separate drying-screens or fruit-trays is shown in Figs. 2 and 3.

A′ is the top view, showing strips *c c*, on which the fruit is to be placed, so as to lie in the track of the currents of hot air which rises between these strips, as indicated by arrows. The end view of these trays is shown at B, and the lower edge of these ends is beveled, as seen at *a′ b*, so as to fit the slides *a*, on which the trays rest when in place. These screens or trays are removable, and, when placed in the chamber H, they fit together, thus forming an inclined series of separate flues or air-passages, arranged like a series of stairs, each having a separate tray, as seen at A B C D E F. The hot air from the stove I and chamber J rises through the lower air-passage G, and passes through the flues in divided currents, and then escapes through the upper air-passage G′, which is wider at the upper end than below, while the passage G is wider below than at its upper end. By this arrangement all the flues are supplied with a full quantity of air and a strong current through the perforated bottoms of the trays; and the air remains only a moment in contact with the fruit, and then passes off in the upper passage G′, without again touching the fruit.

The fruit is put upon the trays, which are then slid into the lower end of the box H, resting on the slides or tracks *a*, the forward tray or trays being pushed or slid upward and forward by each succeeding tray till the series is complete; and as the fruit becomes dry enough the upper tray is removed from the box through the discharge-door H‴, which is provided with a perforated plate or wire screen, *h*. The door H″ serves to inspect the fruit and the progress of the drying, and the lower door H′ is for the entrance of the trays. All of these doors are represented in black lines as open, and in dotted lines as closed. If, upon inspection, the fruit is not dry enough in the upper trays, the contents of two trays may be put into one tray and the drying continued, while a tray of fresh fruit is added at the lower end of the box, keeping the series complete.

The standard K supports the upper end of the box, and is hinged thereto for the purpose of raising or lowering the upper end of the box, thus changing the inclination when desired, and consequently increasing or diminishing the speed of the current of air through the box. In making this change, care must be taken to properly control the admission of air to the chamber J and the lower passage G of the box H.

The arrows in Fig. 1 show the direction of the air-currents through the trays, and how the vapor-laden current of air is driven away from the fruit into the upper part of the box.

I do not limit my invention to the precise construction above described, so long as the same principles and advantages are preserved.

Having thus described my invention, I claim—

1. In a fruit-drier, the combination of an upper and a lower inclined hot-air chamber or flue and a series of perforated trays, constituting the partition between the two inclined flues, substantially as set forth.

2. In a drier, the combination of an upper and a lower inclined hot-air chamber or flue and a series of perforated trays, each tray forming a short vertical flue leading from the lower to the upper inclined flue, substantially as specified.

3. In a drier, the combination of a lower and an upper inclined hot-air chamber or flue, the lower communicating with the upper by passages formed in each of a series of trays, which separate the two inclined flues, the whole adapted to convey heated air through the contents of the trays, and then discharge it directly into a flue connecting with the open air.

4. The construction and arrangement of the series of trays and isolated flues A B C D E F, in combination with the inclined box H, said flues and trays being placed between the air-supply passage G and the escape-passage G′, substantially as described.

5. The inclined box or flue H, divided or separated by the trays and flues A B C D E F into a lower air-supply passage and an upper escape-passage, substantially as set forth.

6. In a drier, a series of sliding trays, in combination with the inclined box or flue, H, substantially as and for the purposes set forth.

7. The inclined chamber or box H, in combination with the perforated fruit trays or screens and a stove or hot-air-supply chamber or passage, substantially as specified.

8. The tray B for drying fruit, constructed with beveled ends *a′ b*, close sides and ends, and slat bottom *c c c*, substantially as and for the purpose described.

9. A series of flues, formed substantially in the manner described, for dividing the general supply-current of hot air, thus directing each smaller current to a separate parcel of fruit upon a perforated tray or screen, substantially as set forth.

10. A series of trays arranged in contact on an inclined slide or slides, and adapted to be moved, one after the other, over the same track, the lowest tray pushing the others before it, substantially as set forth.

In testimony that I claim the foregoing I have hereunto set my hand this 29th day of April, 1876.

BENJAMIN L. RYDER.

Witnesses:
JOHN JEFFRIES,
LYMAN S. CLARKE.